US009362700B2

(12) United States Patent
Charlton et al.

(10) Patent No.: US 9,362,700 B2
(45) Date of Patent: Jun. 7, 2016

(54) DEVICE FOR DETERMINING A CRIMP HEIGHT OF A CRIMPED ELECTRICAL CONNECTION

(71) Applicant: Tyco Electronics Corporation, Berwyn, PA (US)

(72) Inventors: John Dunaway Charlton, Harrisburg, PA (US); Khalil John Maalouf, Chambersburg, PA (US); David Michael Stull, Etters, PA (US); Charles David Fry, New Bloomfield, PA (US); Keith Lynn Nicholas, Harrisburg, PA (US)

(73) Assignee: TYCO ELECTRONICS CORPORATION, Berwyn, PA (US)

(*) Notice: Subject to any disclaimer, the term of this patent is extended or adjusted under 35 U.S.C. 154(b) by 0 days.

(21) Appl. No.: 14/457,852

(22) Filed: Aug. 12, 2014

(65) Prior Publication Data

US 2015/0047182 A1 Feb. 19, 2015

Related U.S. Application Data

(63) Continuation-in-part of application No. 13/965,854, filed on Aug. 13, 2013.

(51) Int. Cl.

| | |
|---|---|
| ***B23P 19/00*** | (2006.01) |
| ***H01R 43/042*** | (2006.01) |
| ***H01R 43/048*** | (2006.01) |

(52) U.S. Cl.

CPC ....... *H01R 43/0488* (2013.01); *Y10T 29/53235* (2015.01)

(58) Field of Classification Search

CPC ..... G01N 29/04; G01N 29/07; G01N 29/221; G01N 29/265; H01R 43/048; H01R 43/0486; H01R 43/0488; H01R 43/058; H01R 43/0207; Y10T 29/53022; Y10T 29/53196; Y10T 29/53235; Y10T 29/5327

USPC ....................................... 29/705, 753; 73/588

See application file for complete search history.

(56) References Cited

U.S. PATENT DOCUMENTS 4,018,499 A * 4/1977 Rickards ....................... 439/396
4,856,186 A 8/1989 Yeomans (Continued)

FOREIGN PATENT DOCUMENTS

DE 3737924 A1 5/1989
WO WO2012/106390 8/2012

OTHER PUBLICATIONS

International Search Report, International Application No. PCT/US2014/050886, International Filing Date, Aug. 13, 2014.

*Primary Examiner* — Paul D Kim

(57) ABSTRACT

A terminal crimping device includes crimp tooling defining a crimp zone configured to receive a wire and a terminal. The terminal is configured to be crimped to the wire by the tooling during a crimp stroke of the crimp tooling to form a crimped terminal. The crimp tooling includes an ultrasound module ultrasonically coupled to the crimp tooling and the wire and the crimped terminal when present. The ultrasound module transmits acoustic signals through the crimped terminal and the wire. The ultrasound module also receives echo acoustic signals being reflected back to the ultrasound module. The ultrasound module generates echo signals based on the echo acoustic signals. The terminal crimping device also includes a crimp quality module that receives the echo signals from the ultrasound module and determines a crimp height of the crimped terminal based on the reflected echo acoustic signals received by the ultrasound module.

13 Claims, 5 Drawing Sheets

(56) References Cited

U.S. PATENT DOCUMENTS

| | | | | | |
|---|---|---|---|---|---|
| 5,046,241 | A | | 9/1991 | Ricard | |
| 5,123,165 | A | | 6/1992 | Strong et al. | |
| 5,195,352 | A | * | 3/1993 | Grois et al. | 72/409.16 |
| 5,197,186 | A | | 3/1993 | Strong et al. | |
| 5,415,015 | A | * | 5/1995 | Klemmer et al. | 72/412 |
| 5,570,514 | A | * | 11/1996 | Hashimoto et al. | 33/784 |
| 5,692,294 | A | * | 12/1997 | Casey | 29/753 |
| 7,181,942 | B2 | * | 2/2007 | Yost et al. | 72/17.2 |
| 7,228,625 | B1 | * | 6/2007 | Zerebilov | 29/861 |
| 9,003,645 | B1 | * | 4/2015 | Yost et al. | 29/753 |
| 2003/0008548 | A1 | * | 1/2003 | Ueda et al. | 439/422 |
| 2005/0193792 | A1 | | 9/2005 | Yost et al. | |
| 2011/0034091 | A1 | * | 2/2011 | Kobayashi et al. | 439/877 |
| 2012/0060585 | A1 | | 3/2012 | Yost et al. | |
| 2012/0263344 | A1 | * | 10/2012 | Viviroli | 382/100 |
| 2013/0130567 | A1 | * | 5/2013 | Onuma et al. | 439/877 |
| 2013/0197823 | A1 | | 8/2013 | Williams | |

* cited by examiner

DEVICE FOR DETERMINING A CRIMP HEIGHT OF A CRIMPED ELECTRICAL CONNECTION

CROSS REFERENCE TO RELATED APPLICATIONS

This application is a Continuation-In-Part Application of U.S. application Ser. No. 13/965,854 filed Aug. 13, 2013 now pending, the subject matter of which is herein incorporated by reference in its entirety

BACKGROUND OF THE INVENTION

The subject matter herein relates generally to systems for determining a crimp height of a crimped electrical connection.

Terminals are typically crimped onto wires by means of a conventional crimping press having an anvil for supporting the electrical terminal and a ram that is movable toward and away from the anvil for crimping the terminal. In operation, a terminal is placed on the anvil, an end of a wire is inserted into the ferrule or barrel of the terminal, and the ram is caused to move toward the anvil to the limit of the stroke of the press, thereby crimping the terminal onto the wire. The ram is then retracted to its starting point.

In order to obtain a satisfactory crimped connection, the crimp height and other characteristics of the crimped terminal must be closely controlled. The crimp height of a terminal is a measure of height or maximum vertical dimension of a given portion of the terminal after crimping. Ordinarily, if a terminal is not crimped to the correct crimp height for the particular terminal and wire combination, an unsatisfactory crimped connection will result. Some systems measure crimp height by manual measurements of the terminals which can be slow and tedious. Some systems measure crimp height based on ram displacement measurements. For example, simple non-destructive means of detecting such defective crimped connections by accurately measuring crimp height during the crimping process is disclosed in U.S. Pat. Nos. 4,856,186 and 4,916,810 to Yeomans.

New technologies in ultrasonic monitoring have been proposed for use in crimp quality monitoring. For example, U.S. Pat. No. 7,181,942 describes an ultrasonic device and method for measuring crimp connections by comparing signals with signals from a previous crimp that was determined to be desirable through destructive testing.

A need remains for a crimp quality monitoring system that uses ultrasonic monitoring to determine a crimp height of a crimped terminal.

BRIEF DESCRIPTION OF THE INVENTION

In an embodiment, a terminal crimping device is provided. The terminal crimping device includes crimp tooling defining a crimp zone configured to receive a wire and a terminal. The terminal is configured to be crimped to the wire by the tooling during a crimp stroke of the crimp tooling to form a crimped terminal. The crimp tooling includes an ultrasound module coupled to the crimp tooling and being ultrasonically coupled to the wire and the crimped terminal of the crimp tooling. The ultrasound module transmits acoustic signals through the wire and the crimped terminal. The ultrasound module also receives echo acoustic signals being reflected back to the ultrasound module. The ultrasound module generates echo signals based on the echo acoustic signals. The terminal crimping device also includes a crimp quality module that receives the echo signals from the ultrasound module and determines a crimp height of the crimped terminal based on the reflected echo acoustic signals received by the ultrasound module.

In another embodiment, a terminal crimping device is provided. The terminal crimping device includes crimp tooling defining a crimp zone configured to receive a wire and a terminal. The terminal is configured to be crimped to the wire by the crimp tooling during a crimp stroke of the crimp tooling to form a crimped terminal. The terminal crimping device also includes an ultrasound module coupled to the crimp tooling and is ultrasonically coupled to the wire and the crimped terminal. The ultrasound module receives echo acoustic signals being reflected back to the ultrasound module and generates echo signals based on the echo acoustic signals. The terminal crimping device also includes a crimp quality module that receives the echo signals from the ultrasound module. The crimp quality module determines a crimp height of the crimped terminal based on the reflected echo acoustic signals received by the ultrasound module and a speed of sound transmission coefficient. The terminal crimping device also includes a calibration module coupled to the crimp quality module that receives the echo signals from the ultrasound module. The calibration module estimates the speed of sound transmission coefficient through the materials of the wire and the crimped terminal based on a measured crimp height of the crimped terminal.

DETAILED DESCRIPTION OF THE INVENTION

Figure 1:
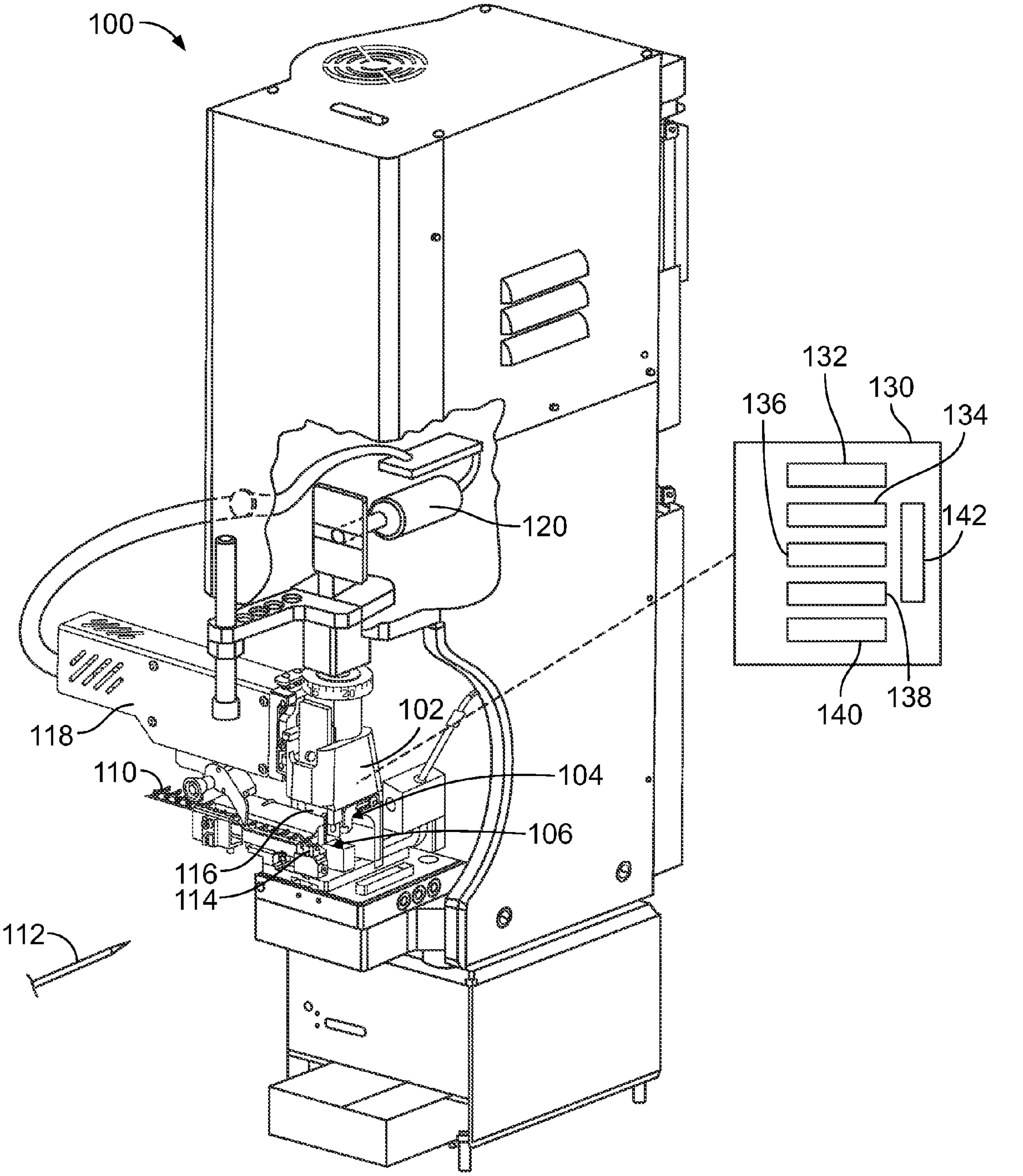
FIG. 1 is a perspective view of a terminal crimping device according to an exemplary embodiment.

FIG. 1 is a perspective view of a terminal crimping device 100 formed in accordance with an exemplary embodiment. The terminal crimping device 100 is used for crimping terminals to wires. In the illustrated embodiment, the terminal crimping device 100 is a bench machine having an applicator 102. Alternatively, the terminal crimping device 100 may be another type of crimping machine, such as a lead maker or a hand tool.

The terminal crimping device 100 includes crimp tooling 104 that is used to form the terminal during the pressing or crimping operation. The terminal crimping device 100 has a terminating zone or crimp zone 106 defined between the crimp tooling 104. Electrical connectors or terminals 110 and an end of a wire 112 are presented in the crimp zone 106 between the crimp tooling 104. In an exemplary embodiment, the crimp tooling 104 used for crimping includes an anvil 114 and a ram 116. The anvil 114 and/or the ram 116 may have removable dies that define the shape or profile of the terminal 110 during the crimping process. In the illustrated embodiment, the anvil 114 is a stationary component of the applicator 102, and the ram 116 represents a movable component. Alternatively, both the ram 116 and the anvil 114 may be movable. For example, with hand tools, typically both halves of the crimp tooling 104 are closed toward each other during the crimping operation.

The terminal crimping device 100 includes a feeder device 118 that is positioned to feed the terminals 110 to the crimp zone 106. The feeder device 118 may be positioned adjacent to the mechanical crimp tooling 104 in order to deliver the terminals 110 to the crimp zone 106. The terminals 110 may be guided to the crimp zone 106 by a feed mechanism to ensure proper placement and orientation of the terminal 110 in the crimp zone 106. The wire 112 is delivered to the crimp zone 106 by a wire feeder (not shown).

The terminal crimping device 100 may be configured to operate using side-feed type applicators and/or end-feed type applicators. Side-feed type applicators crimp terminals that are arranged side-by-side along a carrier strip, while end-feed type applicators crimp terminals that are arranged successively, end-to-end on a carrier strip. The terminal crimping device 100 may be configured to accommodate both side-feed and end-feed types of applicators, which may be interchangeable within the terminal crimping device 100.

During a crimping operation, the ram 116 of the applicator 102 is driven through a crimp stroke by a driving mechanism 120 of the terminal crimping device 100 initially towards the stationary anvil 114 and finally away from the anvil 114. Thus, the crimp stroke has both a downward component and an upward component. The crimping of the terminal 110 to the wire 112 occurs during the downward component of the crimp stroke. During the crimping operation, a terminal 110 is loaded onto the anvil 114 in the crimp zone 106, and an end of the wire 112 is fed within a crimp barrel of the terminal 110. The ram 116 is then driven downward along the crimp stroke towards the anvil 114. The ram 116 engages the crimp barrel of the terminal 110 and deforms (e.g. folds or rolls) the ends of the crimp barrel inward around the wire 112. The crimp tooling 104 crimps the terminal 110 onto the wire 112 by compressing or pinching the terminal 110 between the ram 116 and the anvil 114. The ram 116 then returns to an upward position. As the ram 116 moves upward, the ram 116 releases or separates from the terminal 110. In an exemplary embodiment, the resilient nature of the terminal 110 and/or wires 112 causes the terminal 110 to rebound slightly from the bottom dead center of the downward portion of the crimp stroke. The elastic yield or spring back of the terminal 110 will follow the ram 116 for a portion of the return or upward part of the stroke of the ram 116 until the terminal 110 reaches a final or stable size. At such point, the terminal 110 has a particular crimp height measured between the bottom and top most points of the terminal 110.

The operation of the terminal crimping device 100 is controlled by a control module 130. For example, the control module 130 may control the operation of the driving mechanism 120. The control module 130 may control the operation of the feeder device 118 and synchronizes the timing of the crimp stroke with the timing of a feed stroke of the feeder device 118. In an exemplary embodiment, the control module 130 includes a crimp quality module 132 that determines a crimp quality of the particular crimp. The terminal 110 may be discarded if the crimp quality does not meet certain specifications. In an exemplary embodiment, the crimp quality module 132 determines a crimp height of the terminal as a measure of crimp quality. The crimp quality module 132 may determine crimp quality based on other characteristics in addition to, or in the alternative to, the crimp height, such as a force measurement or force profile of the terminal during the crimp.

Optionally, the control module 130 may have a linear position module 134 for determining the crimp height, such as by determining a spacing distance between the ram 116 and the anvil 114. For example, after calibration, the linear position module 134 may be used to determine crimp height. The linear position module 134 may be used to determine the position of the ram 116 at a particular time (e.g. at bottom dead center or when the ram 116 separates from the terminal 110) for comparison of one crimp to the next, which may be a quality control check. The linear position module 134 may be used to determine when the crimp tooling is in motion, and thus operate other modules based on the signals from the linear position module 134.

Optionally, the control module 130 may have a force detection module 136 for determining a force applied to the terminal by the crimp tooling 104 during the crimping operation. The crimp quality module 132 may determine crimp quality based on the crimp height and the measured force. Optionally, the control module 130 may have an adjustment module 138 for adjusting the relative positions of the ram 116 and/or the anvil 114. Such adjustment may be performed using computer controlled positioners. Adjustment of the positions of the ram 116 and/or the anvil 114 may change the bottom dead center position of the ram 116 relative to the anvil 114. Adjustment of the positions of the ram 116 and/or the anvil 114 may change the crimp height of the terminal. Adjustments may be made based upon the crimp quality determined by the crimp quality module 132.

In an exemplary embodiment, the control module 130 includes an ultrasound module 140 for transmitting and receiving ultrasonic acoustic signals, also referred to hereinafter as acoustic waves. The ultrasound module 140 may cause acoustic signals to be transmitted through the terminal 110 and the wire 112 during the crimping operation. The crimp quality module 132 may determine crimp quality based on the acoustic signals transmitted through the terminal 110 and the wire 112. The crimp quality module 132 may determine a crimp height of the terminal 110 based on the acoustic signals transmitted through the terminal 110 and the wire 112. The crimp quality module 132 may determine a shape of the crimped terminal based on the acoustic signals transmitted through the terminal 110 and the wire 112. The ultrasound module 140 may cause acoustic signals to be transmitted through the ram 116 and/or the anvil 114 in addition to the terminal 110 and the wire 112 during the crimping operation. For example, in some embodiments, the acoustic signals may be generated at a transducer in the ram 116, transmitted through the ram 116, through the terminal 110, through the wire 112 and through the anvil 114 and then received at a transducer in the anvil 114. In some embodiments, the acoustic signals may be generated at a transducer in the anvil 114, transmitted through the anvil 114, through the terminal 110, through the wire 112 and through the ram 116 and then received at a transducer in the ram 116. In some embodiments, the acoustic signals may be generated at a transducer in the ram 116, transmitted through the ram 116, through the terminal 110, through the wire 112 and then back through the ram 116 and then received at a transducer in the ram 116, which may be the same transducer that generated the acoustic signal. In some embodiments, the acoustic signals may be generated at a transducer in the anvil 114, transmitted through the anvil 114, through the terminal 110, through the wire 112 and then back through the anvil 114 and then received at a transducer in the anvil 114, which may be the same transducer that generated the acoustic signal.

Optionally, the control module 130 may have a calibration module 142 for calibrating one or more modules of the control module 130. For example, the calibration module 142 may be used to determine heights, distances, ultrasonic frequencies, coefficients of materials used in the system, and the like, which may be used by the crimp quality module 132 or other modules to perform calculations or in running algorithms to determine the crimp height or other characteristics of the system.

Optionally, the function of any of the modules may be combined into one or more other modules. For example, the calibration and crimp quality modules may combined into a single module, and the like.

Figure 2:
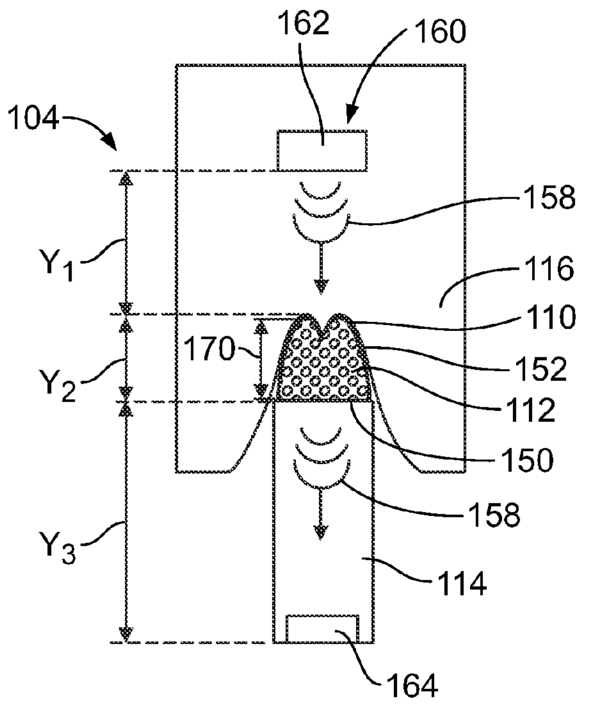
FIG. 2 illustrates a portion of the terminal crimping device showing ultrasonic transducers attached to an anvil and ram used to form a crimped terminal during a crimping operation.

FIG. 2 illustrates a portion of the terminal crimping device 100 showing the anvil 114 and the ram 116 used to form the crimp during the crimping operation. The crimp tooling 104 forms an F-crimp in the illustrated embodiment; however other shape crimp tooling may form crimps having other shapes in alternative embodiments.

The anvil 114 has a support surface 150 used to support the terminal 110. In the illustrated embodiment, the support surface 150 is flat and horizontal; however the support surface 150 may have other shapes and orientations in alternative embodiments. The terminal 110 rests on the support surface 150 as the ram 116 is moved through the crimp stroke.

The ram 116 has a forming surface 152 that engages the terminal 110 during the crimping process. The forming surface 152 presses the sidewalls of the terminal barrel inward during the crimping process. The forming surface 152 compresses the sidewalls against the wire 112 during the crimping process. When the ram 116 is in contact with the terminal 110, acoustic signals 158 may be transmitted across the forming surface 152 into the terminal 110 and wire 112. The acoustic signals 158 may be transmitted across the support surface 150 into the anvil 114. The acoustic signals 158 may be reflected at the interfaces defined at the forming surface 152 and support surface 150. The acoustic signals 158 may be referred to hereinafter as acoustic waves 158 or transmitting acoustic waves 158. The reflected signals may be referred to as echo acoustic signals or echo waves.

In an exemplary embodiment, the ultrasound module 140 (shown in FIG. 1) includes one or more ultrasonic transducers 160 that transmit and/or receive acoustic signals 158 in the ultrasonic frequency range. In the illustrated embodiment, the ultrasound module 140 includes an ultrasonic transmitting transducer 162 and an ultrasonic receiving transducer 164. The ultrasonic transmitting transducer 162 is coupled to the ram 116, while the ultrasonic receiving transducer 164 is coupled to the anvil 114. In other embodiments, the ultrasonic receiving transducer 164 may be coupled to the ram 116 and/or the ultrasonic transmitting transducer 162 may be coupled to the anvil 114. In other embodiments, rather than having dedicated transmitting and receiving transducers, either or both of the transducers 162, 164 may be capable of transmitting and receiving the acoustic signals 158. In other embodiments, only one transducer 162 or 164 is needed that is capable of transmitting and receiving the acoustic signals 158. The ultrasonic transducers 160 may be coupled to an outer surface of the crimp tooling 104. Alternatively, the ultrasonic transducers 160 may be embedded within the crimp tooling 104. The ultrasonic transducers 160 are ultrasonically coupled to the crimp tooling 104, wherein the acoustic signals 158 may be transmitted to or from the ultrasonic transducers 160 to or from the crimp tooling 104. The ultrasonic transducers 160 are ultrasonically coupled to the terminal 110 and wire 112 via the crimp tooling 104.

In an exemplary embodiment, the ultrasonic transducers 160 are piezoelectric transducers that convert electrical energy into sound. The piezoelectric transducers change size when a voltage is applied thereto. The ultrasound module 140 includes electric circuitry coupled to the ultrasonic transmitting transducer 162 to supply an alternating current across the ultrasonic transducer 162 to cause oscillation at very high frequencies to produce very high frequency sound waves. The ultrasonic receiving transducer 164 generates a voltage when force is applied thereto from the acoustic signals 158 and the electric signal generated at the ultrasonic receiving transducer 164 is transmitted by electric circuitry coupled thereto to the ultrasound module 140 and/or the crimp quality module 132 (shown in FIG. 1). Other types of ultrasonic transducers 160 other than piezoelectric transducers may be used in alternative embodiments, such as magnetostrictive transducers.

In an exemplary embodiment, the ultrasound module 140 is used to determine the crimp height of the formed wire 112 and terminal 110 by generating the ultrasonic acoustic signal 158 at the transmitting transducer 162. The acoustic signal 158 travels through the crimp tooling 104 and crimped terminal 110 and wire 112 in the form of a longitudinal sound wave, however the wave may be propagated in any direction. The ultrasonic receiving transducer 164 receives the acoustic signal 158 and converts such signal to an electrical signal for processing, such as by the crimp quality module 132. Such process may be repeated approximately 500 or more times per crimp cycle.

A time T required for the ultrasonic acoustic signal 158 to travel through the ram 116 (e.g. along distance Y1), thorough the terminal 110 and wire 112 (e.g. along distance Y2), and through the anvil 114 (e.g. along distance Y3) can be accurately measured using ultrasonic signal generation and processing equipment at the ultrasound module 140 and/or crimp quality module 132. The distances of the ram 116 and anvil 114, namely Y1 and Y3, are fixed by the crimp tooling 104, while the distance Y2 of the terminal 110 and wire 112 changes during the crimp process. A time T1 for the acoustic signal 158 to travel the distance Y1 can be measured or determined, and is based on a speed of sound transmission coefficient of the material of the ram 116. A time T2 for the acoustic signal 158 to travel the distance Y2 can be measured or determined, and is based on a speed of sound transmission coefficient of the material of the terminal 110 and the wire 112. A time T3 for the acoustic signal 158 to travel the distance Y3 can be measured or determined, and is based on a speed of sound transmission coefficient of the material of the anvil 114.

The total time T to send a signal from the transmitting transducer 162 to the receiving transducer 164 varies directly as the result of a change in the Y2 distance. The Y2 distance is a measure of a crimp height 170 of the terminal 110. The crimp height 170 (e.g. Y2 distance) can be measured at any point during the crimping process. For example, the crimp height 170 can be measured at the bottom dead center of the ram 116, which corresponds to the minimum measured crimp height 170 during the crimping process. The crimp height 170 can be measured at the moment of separation of the ram 116 from the terminal 110 as the acoustic signal 158 will cease to propagate from the transmitting transducer 162 to the receiving transducer 164 when the ram 116 is separated from the terminal 110. The last acoustic signal 158 received generally corresponds to the stable crimp height or final crimp height of the crimped terminal 110.

In an exemplary embodiment, the distance Y1 between the transmitting transducer 162 and the forming surface 152 may be measured during a calibration process using the calibration module 142. The distance Y1 may be measured manually, such as using a tool such as a micrometer. The distance Y1 may be measured by other means, such as by using the ultrasound module 140. For example, the time required to send a signal through the Y1 distance twice can easily be measured by sending a signal from the transducer 162 and then waiting for the echoed signal to return to the transducer 162 after bouncing off the forming surfaces 152. The total time is divided by half to get the one way transmitted time T1. Such process may be performed prior to the crimp process beginning, such as during a calibration process, such that the crimp surface may reflect a stronger signal, rather than transmitting the acoustic signal 158 through the forming surface 152 into the terminal 110. The distance Y1 may be calculated based on the time T1 using a speed of sound transmission coefficient through the known material of the ram 116.

In an exemplary embodiment, the distance Y3 between the transducer 162 and the support surface 150 may be measured during a calibration process using the calibration module 142. The distance Y3 may be measured manually, such as using a tool such as a micrometer. The distance Y3 may be measured by other means, such as by using the ultrasound module 140. For example, the time required to send a signal through the Y3 distance twice can easily be measured by sending a signal from the transducer 164 and then waiting for the echoed signal to return to the transducer 164 after bouncing off the support surface 150. The total time is divided by half to get the one way transmitted time T3. Such process may be performed prior to the crimp process beginning, such as during a calibration process, such that the crimp surface may reflect a stronger signal, rather than transmitting the acoustic signal through the support surface 150 into the terminal 110. The distance Y3 may be calculated based on the time T3 using a speed of sound transmission coefficient through the known material of the anvil 114.

The wire 112 and terminals 110 may be manufactured from various types of material, such as copper, copper alloys, aluminum, aluminum alloys, and the like. The speed at which the acoustic signal 158 travels through the crimped wire and terminal needs to be determined for accurate measurement of the crimp height 170 (e.g. the distance Y2). In an exemplary embodiment, to determine the speed of sound through the wire 112 and through the terminal 110, a test or calibration crimp is performed and the crimp height of the calibration crimp as determined by manual measurement using a tool such as a micrometer or by using a linear encoder that determines a position of the ram 116 relative to the anvil 114. During the calibration crimp the total time required to transmit the ultrasound signal between the transducers 162, 164 is measured and recorded. The crimp tool transmit times T1 and T3 for the ram 116 and anvil 114 are known and constant (e.g. known based on the calibration process described above). The crimp tool transmit times T1 and T3 are subtracted from the total time T. The remaining time T2 is the time the acoustic signal 158 is in the crimped terminal. The time T2 corresponds to the measured calibration crimp height 170 and the speed of sound transmission coefficient of the particular materials used for the terminal 110 and wire 112 may be calculated based on the calibration crimp height 170 and the time T2.

For future crimps using the same material wires and same material terminals, the speed of sound transmission coefficient calculated during the calibration process may be used to determine the crimp height 170 thereof based on the measured time T2 performed during the crimping process. The speed of sound transmission coefficient is used as a constant to calculate the distance Y2 of future crimps. As the distance Y2 is adjusted or changed during the crimping process, the total time T required for the ultrasonic acoustic signal 158 to pass from the transmitting transducer 162 to the receiving transducer 164 will change directly with Y2. Once the speed of sound transmission coefficient constant (for the particular wire and terminal material) is known the process of determining the Y2 distance can be performed as fast as each ultrasonic acoustic signal 158 is generated and processed for the total transmit time. The instant measure of crimp height 170 may be calculated throughout the crimp process. The terminal 110 and wire 112 are subject to elastic yield or spring back. After the ram 116 passes through the bottom dead center, the Y2 distance will start to grow larger as the terminal 110 springs back. At a point past bottom dead center, the terminal 110 and wire 112 return to a stable size and the ram 116 separates from the terminal 110 preventing the transmission of the ultrasonic acoustic signal 158. The point of separation can be determined using the ultrasonic processing equipment and the Y2 distance can be calculated at the point of separation, which corresponds to the final crimp height 170. Since the terminal 110 has returned to a stable size at the point of separation, the final collected Y2 measurement is equal to the final crimp height 170 of the terminal 110 and wire 112.

Figure 3:
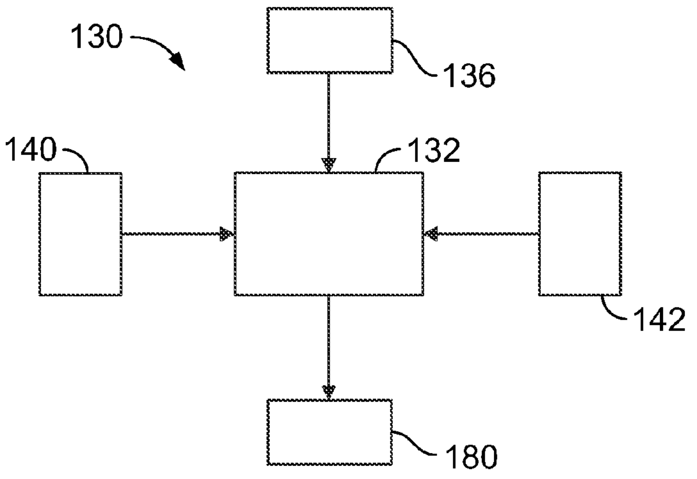
FIG. 3 illustrates an exemplary embodiment of a control module of the terminal crimping device.

FIG. 3 illustrates an exemplary embodiment of the control module 130. The crimp quality module 132 receives signals from the ultrasound module 140. For example, signals relating the transmitting and receiving of the ultrasonic acoustic signals 158 (shown in FIG. 2) are sent to the crimp quality module 132. The signals from the ultrasound module 140 are analyzed, such as to determine the crimp height of the crimped terminal. For example, the crimp quality module 132 may determine the total transmission time T or the transmission time T2 through the crimped terminal, based on the signals from the ultrasound module 140. Based on the transmission time, the crimp height of the crimped terminal may be determined by the crimp quality module 132. Optionally, the crimp quality module 132 may use a speed of sound transmission coefficient for the terminal and wire to determine the crimp height.

The speed of sound transmission coefficient may be determined by the calibration module 142 and sent to the crimp quality module 132 to use in the crimp height calculation. For example, during a calibration process, the crimp height of a calibration or test crimp may be measured and correlated with the transmission time of the acoustic signals during the calibration crimping process to determine the speed of sound transmission coefficient through the particular material of the terminal and wire. Such speed of sound transmission coefficient may be used for the future crimps in the crimp height calculation. Other means or processes may be used to determine the speed of sound transmission coefficient. For example, the speed of sound transmission coefficient may be estimated based on the material characteristics of the materials of the terminal and wire. Such estimations are less accurate but quicker to obtain and use. In other alternative embodiments, the calibration module 142 may be used to determine other constants or coefficients for use in the algorithms used by the crimp quality module 132 to determine crimp height or other meaningful characteristics of the crimped terminal.

Optionally, the crimp quality module 132 may receive signals from the force detection module 136 that relate to forces measured in the crimped terminal during the crimping process. The crimp quality module 132 may determine a crimp profile of the crimped terminal based on the force measurements. The crimp quality module 132 may determine a crimp profile of the crimped terminal based on the force measurements and the crimp height. Signals from the ultrasound module 140 may be used by the crimp quality module 132 to determine which force signals to use in determining crimp quality of the crimped terminal. For example, at the moment of separation between the ram 116 (shown in FIG. 2) and the terminal 110 (shown in FIG. 2), the ultrasonic acoustic signals 158 cease to transmit from the ram through the terminal. The force measurements used by the crimp quality module 132 may cease at the moment of separation, determined by the ultrasound module 140.

The crimp quality module 132 may output data to another component or module of the control module 130, such as a controller 180. The controller 180 may control one or more operations of the terminal crimping device 100 based on the outputs. For example, the controller 180 may cause certain crimps to be discarded if the crimp quality module 132 determines such crimps are defective or inferior. The controller 180 may adjust the relative positions of the ram 116 and anvil 114 (both shown in FIG. 2) to control the crimp height, based on the outputs. The adjustment may be made by sending a signal to the adjustment module 138 (shown in FIG. 1). For example, the anvil 114 may be adjusted up or down to shorten or lengthen the crimp height for a given terminal and wire combination.

Figure 4:
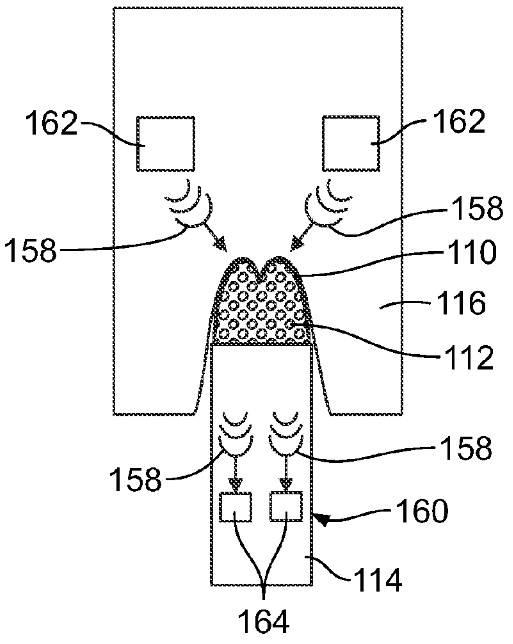
FIG. 4 illustrates a portion of the terminal crimping device showing ultrasonic transducers attached to an anvil and ram used to form a crimped terminal during a crimping operation.

FIG. 4 illustrates a portion of the terminal crimping device 100 showing the anvil 114 and the ram 116 used to form the crimp during the crimping operation. Multiple ultrasonic transducers 160 are illustrated in FIG. 4, with two ultrasonic transmitting transducers 162 on the ram 116 and two ultrasonic receiving transducers 164 on the anvil 114. Any number of transmitting and receiving transducers 162, 164 may be provided on any of the crimp tooling 104 pieces. For example, a transmitting transducer 162 may be coupled to the ram 116 on one side of the terminal 110 and a receiving transducer 162 may be coupled to the ram 116 on the other side of the terminal 110 with the corresponding acoustic signals 158 never passing through the anvil 114. The transducers 160 may be configured to both transmit and receive acoustic signals 158. Additionally, more than two crimp tooling 104 components may be used in other embodiments, such as four pieces that are used to crimp the terminal 110 to the wire 112.

In an exemplary embodiment, both receiving transducers 164 receive the ultrasonic acoustic signals 158 from both transmitting transducers 162. Based on the shape of the tooling dies and thus the terminal 110 and wire 112, the acoustic signals 158 may have different travel times to the receiving transducers 164. The crimp quality module 132 (shown in FIG. 1) may be used to determine the shape of the crimped terminal at any given time based on the acoustic signals received at the different receiving transducers 164. In other embodiments, a single receiving transducer 164 may be used to determine the shape of the crimped terminal by using any number of transmitting transducers 162. In other embodiments, multiple receiving transducers 164 may be used to determine the shape of the crimped terminal by using a single transmitting transducer 162.

Figure 5:
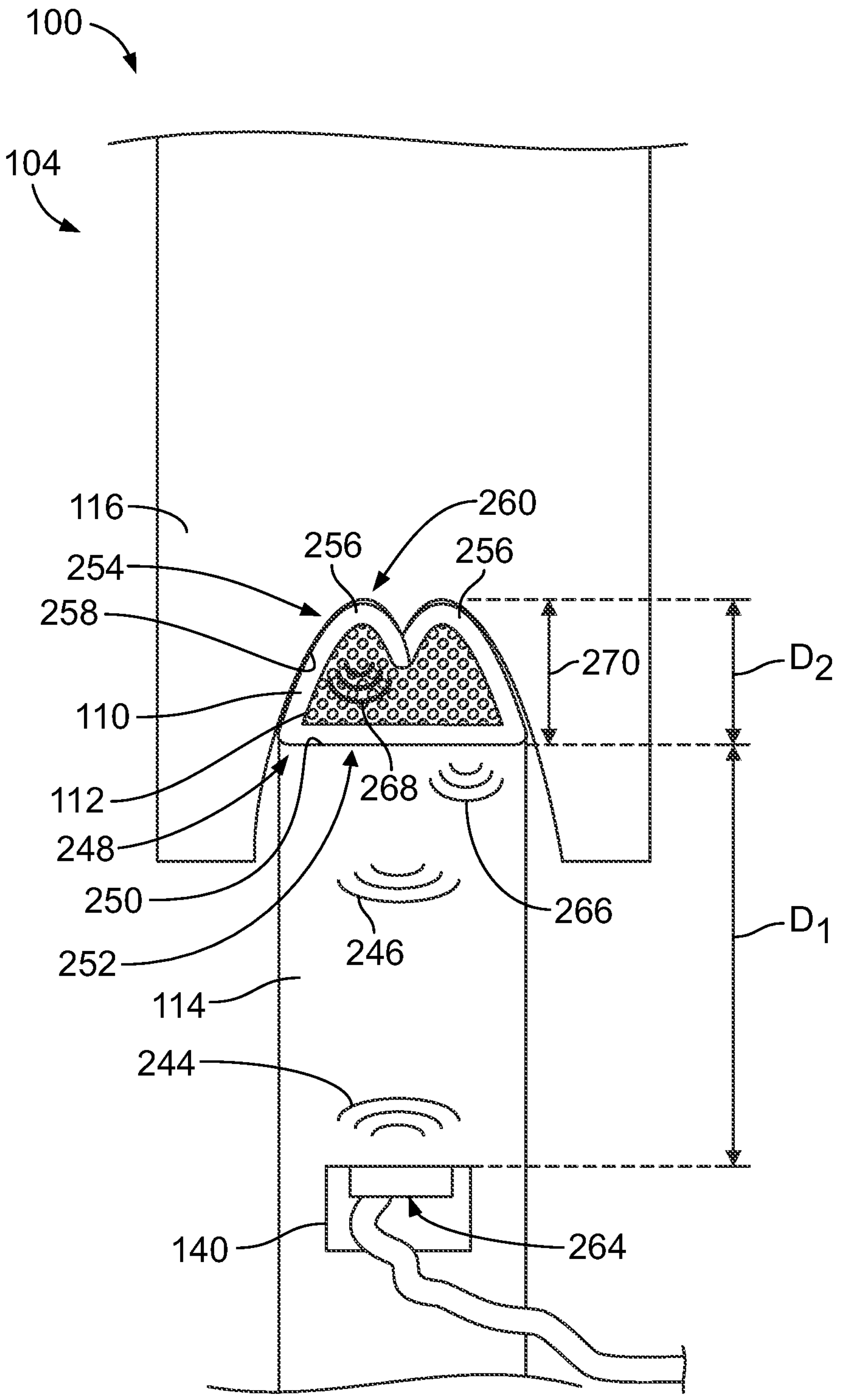
FIG. 5 illustrates a portion of the terminal crimping device formed in accordance with an exemplary embodiment showing an anvil and a ram used to form a crimp during a crimping operation.

FIG. 5 illustrates a portion of the crimped terminal 110 crimping device 100 showing the anvil 114 and the ram 116 used to form the crimp during the crimping operation. The crimp tooling 104 forms an F-crimp in the illustrated embodiment; however other shape crimp tooling may form crimps having other shapes in alternative embodiments.

The anvil 114 has a support surface 248 used to support the terminal 110 (shown in FIG. 1) as the terminal 110 is crimped to the wire 112 to form the crimped terminal 110. In the illustrated embodiment, the support surface 248 is substantially flat and horizontal; however the support surface 248 may have other shapes and orientations in alternative embodiments. The crimped terminal 110 rests on the support surface 248 as the ram 116 is moved through the crimp stroke. Specifically, a bottom surface 250 of the crimped terminal 110 rests on the support surface 248. A lower ultrasonically reflective boundary 252 is defined between the bottom surface 250 and the support surface 248. When ultrasonic acoustic signals 244, also referred to hereinafter as acoustic waves 244, reach the lower reflective boundary 252, the ultrasonic acoustic signals 244 are at least partially reflected, such as, back toward the ultrasound module 140, to generate echo acoustic signals 246 also referred to hereinafter as echo waves 246. To differentiate from the echo acoustic signals 246, the acoustic signals 244 may be referred to hereinafter as transmit acoustic signals 244.

The ram 116 has a forming surface 254 that engages the terminal 110 during the crimping process to form the crimped terminal 110. For example, the forming surface 254 presses sidewalls 256 of the terminal 110 inward during the crimping process. A top surface 258 of the sidewalls 256 and the forming surface 254 define an upper ultrasonically reflective boundary 260 therebetween. As with the lower reflective boundary 252, the upper reflective boundary 260 may be a boundary in which acoustic signals 244 may be at least partially reflected to generate echo acoustic signals 246.

In an exemplary embodiment, the ultrasound module 140 includes one or more transducers, such as an ultrasonic transducer 264, that generate or transmit the acoustic signals 244 and that receive the echo acoustic signals 246. The waves 244, 246 may be acoustic or sound waves in the ultrasonic frequency range. The transducers may generate acoustic waves in the form of longitudinal sound waves, which may be propagated in any direction. In some embodiments, the ultrasound module 140 may include more than one transmitter and receiver. For example, the ultrasound module 140 may include a transmitting transducer and a separate receiving transducer.

In an exemplary embodiment, the ultrasonic transducer 264 is a piezoelectric transducer that converts electrical energy into sound. The piezoelectric transducer changes size when a voltage is applied thereto. The ultrasound module 140 includes electric circuitry coupled to the ultrasonic transducer 264 to supply a voltage across the ultrasonic transducer 264 to cause oscillation at very high frequencies to produce very high frequency sound waves, such as the acoustic signals 244. The ultrasonic transducer 264 generates electrical echo signals (for example, a voltage) when force is applied thereto from the echo acoustic signals 246. Other types of ultrasonic transducers other than piezoelectric transducers may be used in alternative embodiments, such as magnetostrictive transducers.

Figure 7:
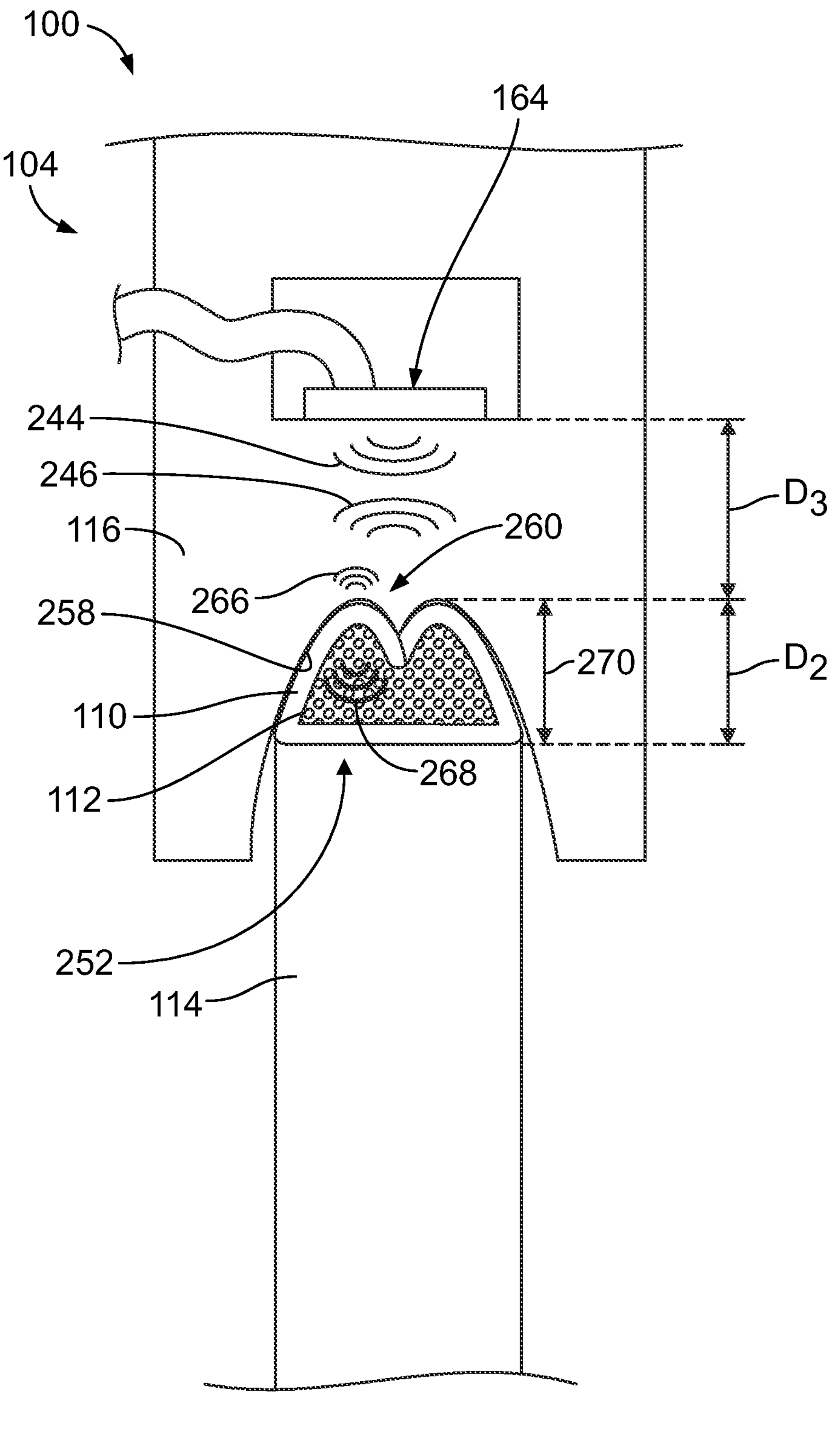
FIG. 7 illustrates the terminal crimping device formed in accordance with an exemplary embodiment.

In the illustrated embodiment, the ultrasound module 140 includes the ultrasonic transducer 264 in the anvil 114 configured to transmit and receive ultrasonic acoustic signals or waves. However, in other embodiments, other arrangements are possible. For example, FIG. 7 shows an alternative embodiment in which the ultrasound module 140 includes the ultrasonic transducer 264 in the ram 116. As another example, the ultrasonic transducer 264 may be coupled to an outer surface of the crimp tooling 104. Alternatively, the ultrasonic transducer 264 may be embedded within the crimp tooling 104. The ultrasonic transducer 264 is ultrasonically coupled to the crimp tooling 104, such that the acoustic signals 244 may be transmitted through the crimp tooling 104. The ultrasonic transducer 264 is also ultrasonically coupled to the crimped terminal 110 and wire 112 via the crimp tooling 104.

The ultrasonic transducer 264 may cause the acoustic signals 244 to be transmitted through the anvil 114 in addition to the crimped terminal 110 and the wire 112 during the crimping operation. For example, the acoustic signals 244 may be generated at the transducer 264 in the anvil 114, transmitted through the anvil 114, through the bottom surface 250 of the crimped terminal 110, and through the wire 112. The acoustic signals 244 may then be reflected off the upper reflective boundary 260 creating the echo acoustic signals 246. The echo acoustic signals 246 may at least partially travel back through the wire 112, through the crimped terminal 110, and through the anvil 114 to be received back at the transducer 264.

The acoustic signals 244 may at least partially reflect off of, and at least partially pass through, the lower reflective boundary 252. Similarly, the acoustic signals 244 may at least partially reflect off of, and at least partially pass through the upper reflective boundary 260. The echo acoustic signals 246 include a first echo 266 and a second echo 268. The first echo 266 may be reflected at a nearest position of the crimped terminal 110 relative to the transducer 264. The second echo 268 may be reflected at a furthest portion of the crimped terminal 110 relative to transducer 264. For example, the transducer 264 in the anvil 114 may transmit acoustic signals 244. The nearest portion of the crimped terminal 110 relative to the transducer 264 may be the bottom surface 250 of the crimped terminal 110. The acoustic signals 244 reflecting off of the lower reflective boundary 252 may generate the first echo 266. In this example, the furthest portion of the crimped terminal 110 relative to the transducer 264 may be the top surface 258 of the crimped terminal 110. The acoustic signals 244 reflecting off of the upper reflective boundary 260 may generate the second echo 268.

In an exemplary embodiment, the crimp quality module 132 (shown in FIG. 1), which may be part of the ultrasound module 140, is used to determine a crimp height 270 of the formed wire 112 and the crimped terminal 110 based on echo signals (e.g., electrical signals, such as a voltage) representative of the first and second echoes 266, 268. Such process may be repeated many times, such as, approximately 500 or more times per crimp cycle. The crimp quality module 132 receives signals (e.g., echo signals) from the ultrasonic transducer 264 and the crimp quality module 132 determines the crimp height 270 of the terminal 110 based on the acoustic signal (e.g., echo acoustic signal 246) received by the ultrasonic transducer 264.

The time required for the ultrasonic acoustic signal 244 to travel through the anvil 114, along a distance D1, and thorough the crimped terminal 110 and wire 112, along a distance D2, can be measured or estimated. The distance of the anvil 114, the distance D1, may be fixed by the crimp tooling 104, while the distance D2 of the crimped terminal 110 and wire 112 changes during the crimp process. A time T1 for the acoustic signal 244 and the echo acoustic signal 246 to travel the distance D1 can be measured or determined, and is based on a speed of sound transmission coefficient of the material of the anvil 114. For example, the transmission time T1 may be approximately 1.3 microseconds. A time T2 for the acoustic signal 244 and the echo acoustic signal 246 to travel the distance D2 can be measured or determined, and is based on a speed of sound transmission coefficient of the material of the crimped terminal 110 and the wire 112. The time T2 is also referred to herein as "transmission time." A total travel time T for the acoustic signals 244 to travel from the transducer 264, reflect off of the lower and/or upper boundaries 252, 260, and return to the transducer 264 varies directly as the result of a change in the D2 distance.

The crimp height 270 may be estimated or measured based on the echo signals by estimating or calculating the time T2. For example, time T2 may be based on half of the total travel time T. The total time T is divided by half to get a one way transmitted time of the first echo 266 and the one way transmitted time T2 of the second echo 268. The crimp height 270 may then be calculated based on a speed of sound coefficient and the time T2, as is discussed below.

Figure 6:
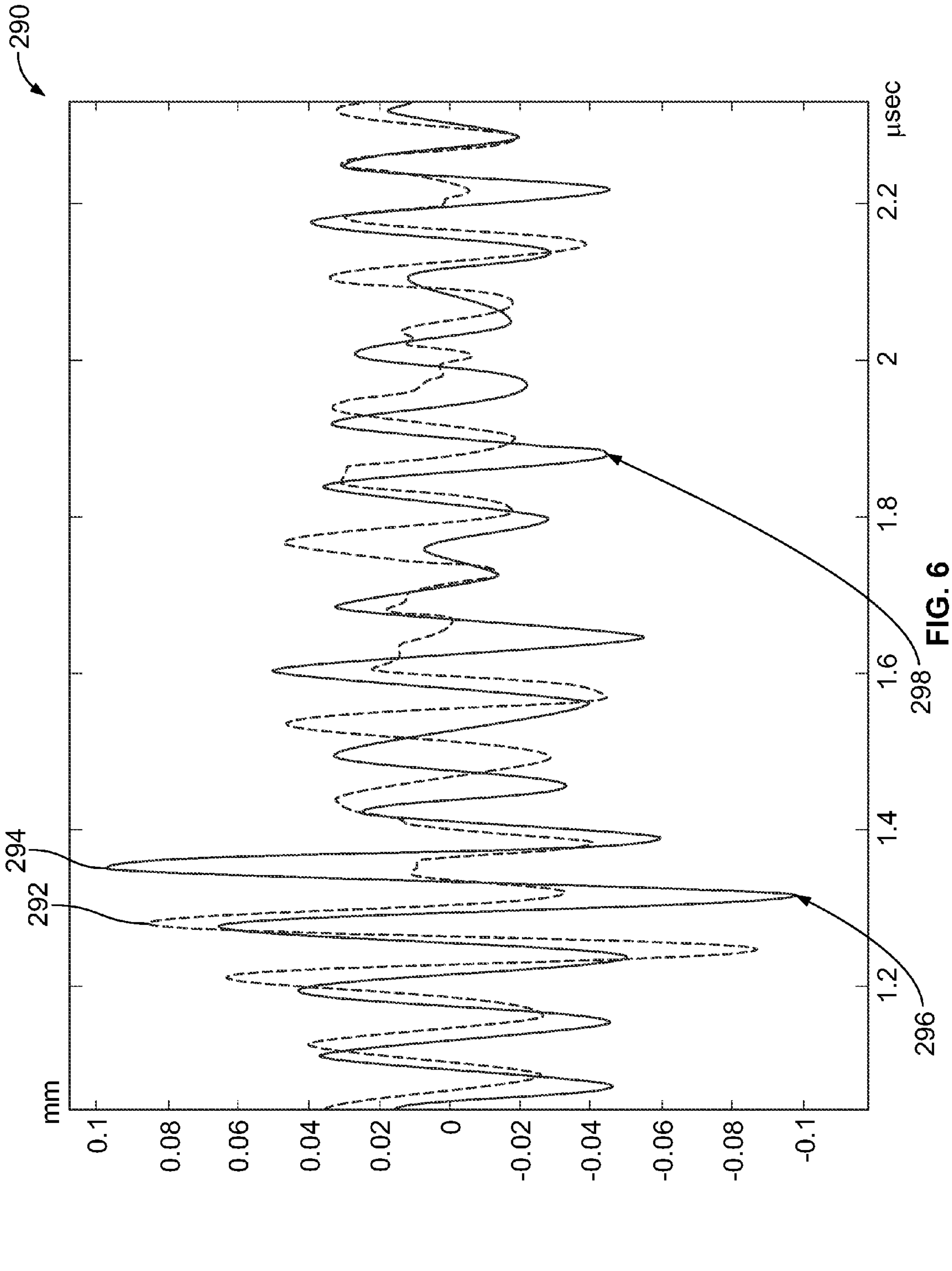
FIG. 6 illustrates a graph showing ultrasonic echo signals received by a crimp quality module.

FIG. 6 illustrates a graph 290 showing echo signals received by the crimp quality module 132 (shown in FIG. 1). The graph 290 includes curves 292 and 294 representative of the ultrasonic echo signals generated by the ultrasonic transducer 264 (shown in FIG. 5) in the anvil 114 (shown in FIG. 5). It should be appreciated that similar curves may be generated by echo signals generated by the ultrasonic transducer 264 (shown in FIG. 7) in the ram 116 (shown in FIGS. 5 and 7). In other embodiments, the curves 292, 294 may represent signal strength, a measure of ultrasonic energy, and/or the like associated with the echo signals.

As illustrated, the graph 290 plots the curves 292, 294 as a function of time in microseconds. The graph 290 is centered on the moment when the ram 116 separates from the crimped terminal 110 after the ram 116 reaches the bottom dead center of the crimp cycle. The time T1 required for the echo acoustic signal 246 (shown in FIG. 5) to travel the distance D1 (shown in FIG. 5), is removed and is not shown in the graph 290. For example, as illustrated, the graph 290 incorporates a 1.3 microsecond time delay (T1) from the beginning of the crimp cycle.

In the illustrated embodiment, the curve 292 represents unfiltered echo signals based on the echo acoustic signals 246. The curve 294 represents the curve 292 after being processed by a matched filter determined from the pre-crimp pulse echo signal. The matched filter may correlate or compare the echo signal with a calibrated signal. For example, the matched filter may perform a convolution of the echo signals in the time domain. For example, the matched filter may compare the transmission time T2 of the second echo 268 (shown in FIG. 5) to a calibrated transmission time Tc. The calibrated transmission time Tc may represent the time when the second echo 268 is expected to be present in the unfiltered data curve 292. The calibrated transmission time Tc may be predetermined or estimated during a previous crimp cycle by the calibration module 142 as discussed below. In other embodiments, other post-processing filters may be used, such as, for example, a filter based on ultrasonic energy output.

The crimp quality module 132 (shown in FIG. 1) may use information in the graph 290 to identify the transmission time T2 of the echo acoustic signals 246 through the crimped terminal 110 and the wire 112. The crimp quality module 132 may identify the first and second echoes 266, 268 (both shown in FIG. 5) in filtered curve 294 to estimate the transmission time T2. As indicated by a peak in the filtered curve 294, a first echo point 296 represents the time of the occurrence of the first echo 266. A second echo point 298 represents the time of the occurrence of second echo 268. As shown, the first echo point 296 occurs at 1.313 microseconds, and the second echo point occurs at 1.879 microseconds. The time difference between the first echo point 296 and the second echo point 298 represents the time for the acoustic signal 244 (shown in FIG. 5) and the echo acoustic signal 246 (shown in FIG. 5) to travel through the crimped terminal 110 and the wire 112. In this example, the difference between the time of the second echo point 298 at 1.879 microseconds and the first echo point 296 at 1.313 microseconds yields a transmission time T2 of 0.565 microseconds.

The crimp height 270 (shown in FIG. 5) may be identified based on the transmission time and the speed of sound coefficient of the crimped terminal 110 and the wire 112. For example, the crimped terminal 110 and the wire 112 may be made of aluminum having a speed of sound coefficient of approximately 6.42 millimeters per microsecond. In this example, the crimp height 270 may be the product of the speed of sound coefficient and half of the transmission time T2. In this example, the crimp height 270 is calculated as the product of 6.42*0.565*0.5 to be approximately 1.84 millimeters. The above calculation, is provided as an example, and is not intended to be limiting. For example, other factors, such as temperature and pressure, may also be considered when calculating the crimp height.

Optionally, the calibration module 142 (shown in FIG. 1) may be used to estimate or measure the calibrated transmission time Tc and the speed of sound coefficient through the materials of the crimped terminal 110 and the wire 112. The calibrated transmission time Tc and speed of sound coefficient may be based on a measured crimp height of a calibration terminal. The calibration terminal may be a terminal similar to the terminal 110 (shown in FIG. 1) and the crimped terminal 110. For example, the calibration terminal may have the same material composition. The calibrated transmission time Tc and speed of sound coefficient may be estimated by measuring the calibrated crimp height. For example, the calibrated crimp height may be obtained through destructive testing of the calibration terminal and/or through the use of the linear position module 134 shown in FIG. 1. The calibration terminal may be discarded after use. The calibration process may be performed prior to the performance of the crimp process.

The wire 112 and crimped terminal 110 may be manufactured from various types of material, such as copper, copper alloys, aluminum, aluminum alloys, and the like. The speed at which the acoustic signals 244 and echo acoustic signals 246 travel through the wire 112 and crimped terminal 110 needs to be determined for accurate measurement of the crimp height 270. In an exemplary embodiment, to determine the speed of sound coefficient through the wire 112 and through the crimped terminal 110, a test or calibration crimp is performed using the calibration terminal.

For future crimps using the same material wires and same material terminals 110 (shown in FIG. 1), the speed of sound transmission coefficient and the calibrated transmission time Tc may be calculated or estimated during the calibration process and may be used to determine the crimp height 270 of subsequent crimped terminals 110 in subsequent crimping operations. Once the speed of sound transmission coefficient (for the particular wire 112 and crimped terminal material 110) is known the process of determining the D2 distance (shown in FIG. 5) can be performed as fast as each ultrasonic echo signal is generated and processed for the total transmit time. The instant measure of crimp height 270 may then be calculated throughout the crimp process.

FIG. 7 illustrates an alternate embodiment of a terminal crimping device 100 having an ultrasonic transducer 200 in the ram 116. The terminal crimping device 100 may include the ultrasonic transducer 200 in place of or in addition to the ultrasonic transducer 264 in the anvil 114. The ultrasonic transducer 200 may be similar to the ultrasonic transducer 264 in the anvil 114 and may be configured to transmit acoustic signals 244 and receive echo acoustic signals 246.

For example, the ultrasonic transducer 200 may generate the acoustic signals 244 in the ram 116 and are transmitted through the ram 116, through the crimped terminal 110, and through the wire 112. The acoustic signals 244 may then be reflected off of the lower reflective boundary 252 creating the echo acoustic signals 268. The echo acoustic signals 268 may at least partially travel back through the crimped terminal 110 and the wire 112, through the ram 116 to be received at the transducer 200. The echo acoustic signals 246 include the first echo 266 and the second echo 268. The first echo 266 may be generated by acoustic signals 244 reflecting off of the upper reflective boundary 260 at the nearest portion of the crimped terminal 110 relative to the transducer 200. For example, the nearest portion may be the top surface 258 of the crimped terminal 110. Acoustic signals 244 reflecting off of the lower reflective boundary 252 may generate the second echo 268.

As discussed above in relation to FIGS. 2 and 3, the crimp quality module 132 (shown in FIG. 1) may determine the crimp height 270 of the formed wire 112 and the crimped terminal 110 based on echo signals representative of the first and second echoes 266, 268.

The time required for the ultrasonic acoustic signal 244 to travel through the ram 116, along a distance D3, and thorough the crimped terminal 110 and wire 112, along the distance D2, can be measured or estimated. The distance of the ram 116, the distance D3, may be fixed by the crimp tooling 104, while the distance D2 of the crimped terminal 110 and wire 112 changes during the crimp process. A time T3 for the acoustic signal 244 and the echo acoustic signal 246 to travel the distance D3 can be measured or determined, and is based on a speed of sound transmission coefficient of the material of the ram 116. As discussed above in relation to FIG. 5, the time T2 for the acoustic signal 244 and the echo acoustic signal 246 to travel the distance D2 can be measured or determined, and is based on a speed of sound transmission coefficient of the material of the crimped terminal 110 and the wire 112. The total travel time T for the acoustic signals 244 to travel from the transducer 200, reflect off of the lower and/or upper boundaries 252, 260, and return to the transducer 200 varies directly as the result of a change in the D2 distance. As discussed above in relation to FIG. 6, the crimp height 270 may be estimated or measured based on the total travel time T.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A terminal crimping device comprising:

crimp tooling defining a crimp zone configured to receive a wire and a terminal configured to be crimped to the wire by the crimp tooling during a crimp stroke of the crimp tooling to form a crimped terminal;

an ultrasound module ultrasonically coupled to the crimp tooling, the ultrasound module transmitting acoustic waves through the wire and the crimped terminal when present, the ultrasound module receiving echo acoustic signals being reflected back to the ultrasound module and generating echo signals based on the echo acoustic signals; and a crimp quality module receiving the echo signals from the ultrasound module, the crimp quality module determining a crimp height of the crimped terminal based on the reflected echo acoustic signals received by the ultrasound module.

2. The terminal crimping device of claim 1, wherein the crimped terminal and the crimp tooling define a boundary therebetween, the echo acoustic signals being reflected at the boundary.

3. The terminal crimping device of claim 1, wherein the echo acoustic signals include a first echo and a second echo, the first echo being reflected at a nearest position of the crimped terminal, the second echo being reflected at a furthest portion of the crimped terminal, the crimp height being determined based on transmission times between the first and second echoes.

4. The terminal crimping device of claim 3, wherein the crimp quality module identifies the transmission time of the second echo using a matched filter, the matched filter comparing the transmission time of the second echo to a calibrated transmission time.

5. The terminal crimping device of claim 4, wherein the crimp quality module measures the transmission time of the second echo through the crimped terminal and determines the crimp height of the crimped terminal based on half of the measured transmission time.

6. The terminal crimping device of claim 1, wherein the crimp tooling includes an anvil and a ram movable toward the anvil, the crimp zone being defined between the anvil and the ram, the crimp height is determined when the ram is at a bottom dead center of the crimp stroke.

7. The terminal crimping device of claim 1, wherein the crimped terminal includes a first boundary between a first portion of the crimped terminal and the crimp tooling, and the crimped terminal includes a second boundary between a second portion of the crimped terminal and the crimp tooling, the echo acoustic signals from the second boundary passing through the first boundary.

8. The terminal crimping device of claim 1, wherein the crimp tooling includes an anvil and a ram movable toward the anvil, the crimp zone being defined between the anvil and the ram, the ultrasound module being coupled to the anvil.

9. The terminal crimping device of claim 1, wherein the crimp tooling includes an anvil and a ram movable toward the anvil, the crimp zone being defined between the anvil and the ram, the ultrasound module being coupled to the ram.

10. The terminal crimping device of claim 1, further comprising a calibration module coupled to the crimp quality module and receiving the echo signals from the crimp quality module, the calibration module estimating a speed of sound transmission coefficient through the materials of the wire and the crimped terminal based on a measured crimp height of the crimped terminal.

11. The terminal crimping device of claim 1, wherein the crimp height is determined based on a speed of sound transmission coefficient of the crimped terminal and the wire.

12. The terminal crimping device of claim 11, further comprising a calibration module configured to estimate the speed of sound transmission.

13. The terminal crimping device of claim 11, wherein the speed of sound transmission coefficient is based on the materials of the crimped terminal and the wire.

* * * * *